United States Patent
Krishnakumar et al.

(10) Patent No.: US 11,163,383 B1
(45) Date of Patent: Nov. 2, 2021

(54) INFORMATION HANDLING SYSTEM STYLUS WITH AN AUTOMATED POWER SWITCH BASED ON WRITING TIP POSITION

(71) Applicant: Dell Products L.P., Round Rock, TX (US)

(72) Inventors: Karthikeyan Krishnakumar, Austin, TX (US); Wong Hin Loong Justin, Singapore (SG)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/927,359

(22) Filed: Jul. 13, 2020

(51) Int. Cl.
*G06F 3/0354* (2013.01)
*G06F 3/044* (2006.01)
*G06F 3/038* (2013.01)

(52) U.S. Cl.
CPC ........ *G06F 3/03545* (2013.01); *G06F 3/0383* (2013.01); *G06F 3/044* (2013.01)

(58) Field of Classification Search
CPC ....... G06F 3/3545; G06F 3/0383; G06F 3/044
See application file for complete search history.

(56) References Cited

U.S. PATENT DOCUMENTS

| | | |
|---|---|---|
| 7,232,271 B2 | 6/2007 | Adams |
| 2013/0249870 A1 | 9/2013 | Slaby et al. |
| 2015/0116290 A1* | 4/2015 | Wheaton ............... B43K 29/08 345/179 |
| 2020/0064936 A1 | 2/2020 | Ko |

FOREIGN PATENT DOCUMENTS

TW    201718284 A    6/2017

* cited by examiner

*Primary Examiner* — Michael Pervan
(74) *Attorney, Agent, or Firm* — Zagorin Cave LLP; Robert W. Holland

(57) ABSTRACT

An information handling system stylus performs touch inputs at a touchscreen display with an active writing tip that receives a capacitive signal from a processing resource, such as an ASIC. A tip position controller selectively retracts and extends the writing tip at an opening formed in a tip cap disposed at the end of the stylus. A power interface cuts off power to the processing resource when the writing tip retracts and applies power to the processing resource when the writing tip extends.

12 Claims, 10 Drawing Sheets

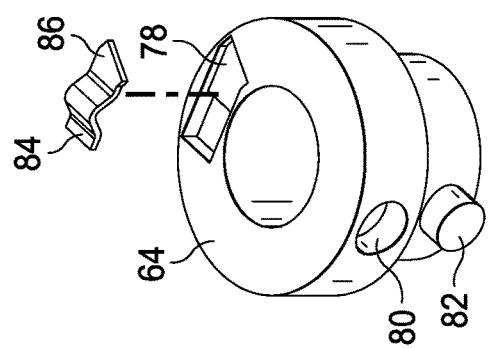
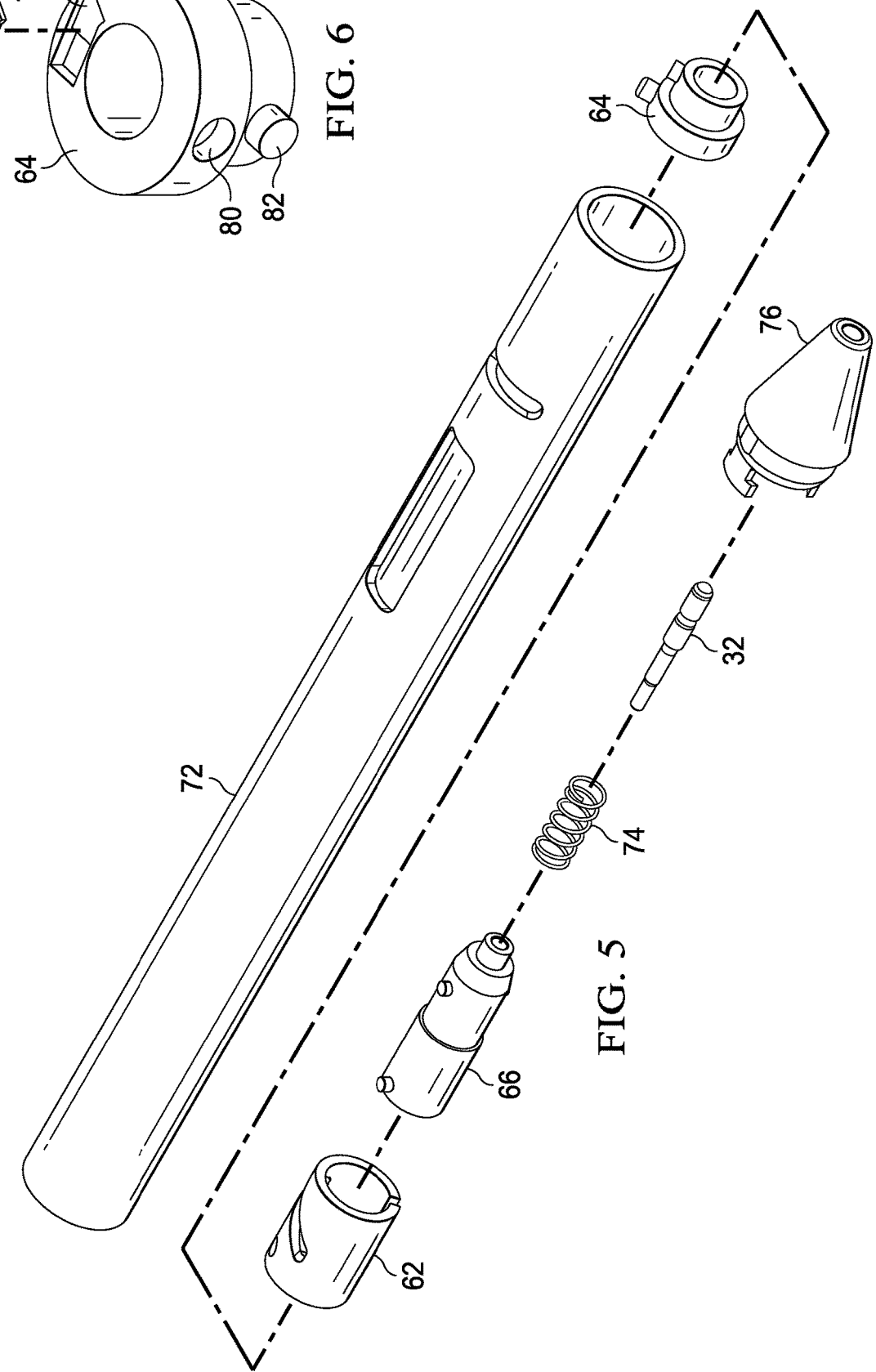

INFORMATION HANDLING SYSTEM STYLUS WITH AN AUTOMATED POWER SWITCH BASED ON WRITING TIP POSITION

BACKGROUND OF THE INVENTION

Field of the Invention

The present invention relates in general to the field of information handling system input devices, and more particularly to an information handling system stylus with an automated power switch based on writing tip position.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems integrate processing components, a display and a power source in a portable housing to support mobile operations. Portable information handling systems allow end users to carry a system between meetings, during travel, and between home and office locations so that an end user has access to processing capabilities while mobile. Tablet configurations typically expose a touchscreen display on a planar housing that both outputs information as visual images and accepts inputs as touches. Convertible configurations typically include multiple separate housing portions that couple to each other so that the system converts between closed and open positions. In some instances, a main housing portion integrates processing components and a keyboard and rotationally couples with hinges to a lid housing portion that integrates a display. In other instances, both housing portions may integrate a display so that one of the displays may be used for typed inputs made at a virtual keyboard presented as an image with key inputs detected as touches. Including a touchscreen display in a convertible information handling system enhances end user interactions.

One tool commonly used with a touchscreen display is a stylus. A stylus typically has a pen form factor, such as a cylindrical housing, and terminates at one end with a writing tip so that an end user can write on a touchscreen display surface as if writing with a pen. Often the writing tip interfaces with an active capacitance circuit that increases touch detection at the touchscreen display by sending a capacitive signal that enhances detection by a capacitive touchscreen sensor. In some instances, the pen includes processing components and wireless communication components, such as a Bluetooth system on chip (SOC), so that an information handling system can interface with and control stylus functions. An end user typically activates Bluetooth at the stylus, such as with an advertising button, and can then draw and write on the touchscreen display to input information.

One difficulty with conventional stylus devices is that the integration of processing resources, a battery and wireless communication resources tend to increase the size of the stylus so that it feels less like a pen. Typically, a stylus will expose a button on the outside of the housing that is pressed to control power and Bluetooth functionality. At application of power, a signal is provided at the writing tip that helps to improve detection of the writing tip by a touchscreen display. In addition, a Bluetooth transceiver in the stylus will typically initiate advertising to establish communication with an information handling system. Generally, to save battery power, the stylus will shut down power after a defined time, such as ten minutes, if no touches are detected at the writing tip. One problem that can arise is that the stylus push button is inadvertently activated, such as when in an end user pocket or when stowed in a location where external objects can hit it. Such inadvertent applications of power not only reduce battery life but can also disrupt writing tip operations by disrupting the signal at the writing tip so that ink splotches can occur when an end user applies the tip to a touchscreen display.

SUMMARY OF THE INVENTION

Therefore, a need has arisen for a system and method which manages power to an information handling stylus writing tip as the writing tip based upon writing tip position extended and retracted relative to one end of the stylus.

In accordance with the present invention, a system and method are provided which substantially reduce the disadvantages and problems associated with previous methods and systems for managing power at an information handling system stylus writing tip. A tip controller disposed in the stylus selectively extends and retracts a writing tip relative to a writing end of the stylus. A power interface disposed at the tip controller cuts off power to the processing resource when the writing tip retracts to a covered position relative to the stylus end and applies power to the processing resource when the tip extends to an exposed position relative to the stylus end.

More specifically, an information handling system processes information with processing components disposed in a housing and presents the information as visual images at a touchscreen display. A stylus makes touch inputs at the touchscreen display with an active writing tip that receives a capacitive signal from a processing resource disposed in the stylus, such as an ASIC interfaced with a transformer. A tip position controller selectively extends and retracts the writing tip from a tip cap at the stylus end. For example, a sleeve having a cam slot engaged with a pin extending from a central body coupled to the writing tip rotates about an axis of the stylus and translates the rotation through the cam slot and pin into axial movement of the central body to extend and retract the writing tip. In an alternative embodiment, the tip cam includes a cam slot on an inner surface that engages a pin extending from the central body so that rotation of the tip cap translates into axial motion of the tip cap to expose and hide the writing tip. A power interface at the tip position controller cuts off power to the processing resource when the writing tip retracts and applies power to the processing resource when the writing tip extends. For instance, a leaf spring rotates with the tip position controller to align with a power pad and complete a power circuit when the writing tip extends and rotates to misalign with the power pad to break the power circuit when writing tip retracts.

The present invention provides a number of important technical advantages. One example of an important technical advantage is that an active writing that receives a capacitive signal from a processing resource in a stylus selectively extends and retracts to protect the writing tip when not in use. Power to the processing resource automatically cuts off and on based upon the writing tip position so that battery life of the stylus is extended and the writing tip remains tuned with an appropriate active capacitance signal so that ink blotting at the touchscreen display is avoided.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 5 depicts an exploded view of the stylus interaction of the mechanical components to synchronize writing tip position and power application;

FIG. 6 depicts a side perspective view of the power control mechanism and leaf spring that cooperate to connect and disconnect power to the stylus processing components;

DETAILED DESCRIPTION

An information handling system stylus provides a retractable writing tip with an automated power switch. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
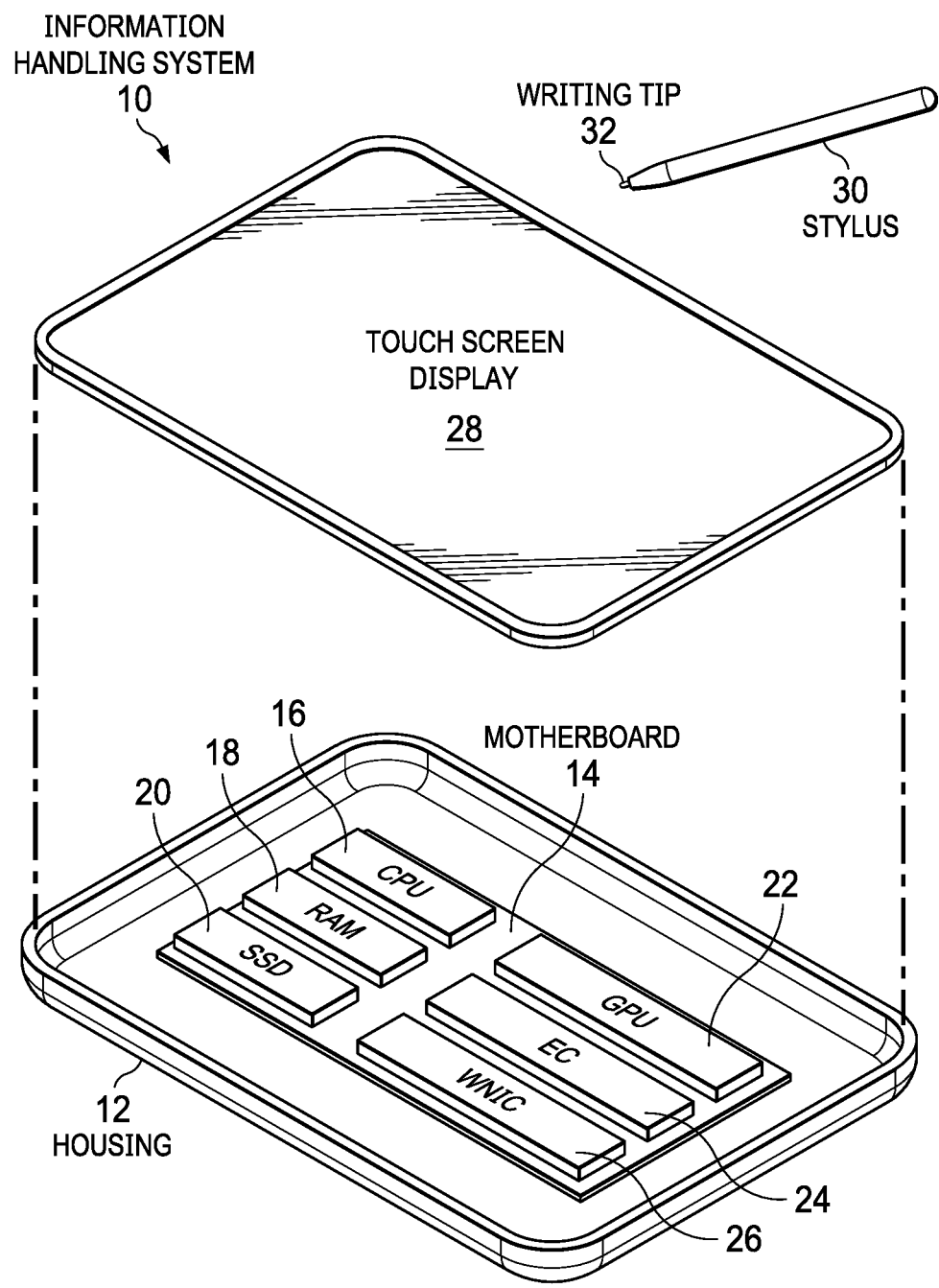
FIG. 1 depicts an exploded view of an information handling system having a stylus that writes on an integrated touchscreen.

Referring now to FIG. 1, an exploded view depicts an information handling system 10 having a stylus 30 that writes on an integrated touchscreen 28. In the example embodiment, information handling system 10 has a tablet configuration built in a planar housing 12 that contains processing components that cooperate to process information. For example, a motherboard 14 interfaces a central processing unit (CPU) 16 that executes instructions to process information with a random access memory (RAM) 18 that stores the instructions and information. A solid state drive (SSD) 20 provides non-transient memory that stores information during power down of the system, such as an operating system and applications that are retrieved to RAM 18 at power up to execute on CPU 16. A graphics processor unit (GPU) 22 interfaces with CPU 16 to process information for presentation as visual images at touchscreen display 28, such as by defining pixel values that are communicated to touchscreen display 28. An embedded controller 24 manages physical operating conditions for the processing components, such as power and thermal conditions, and manages inputs made at input devices, such as touches that are reported from touchscreen display 28. A wireless network interface card (WNIC) 26 provides communication through wireless signals, such as through WiFi and Bluetooth wireless signals. Stylus 30 has a writing tip 32 at one end that touches touchscreen display 28 to make writing/ drawing inputs that are communicated to CPU 16 and presented as visual images. In the example embodiment, stylus 30 is built in a cylindrical housing similar to a pen or other writing utensil that an end user might use to write on paper. Although the example embodiment depicts a tablet configuration of information handling system 10, stylus 30 may write on any touchscreen display in other types of information handling systems, such as convertible systems or touchscreen displays that interface with desktop information handling systems.

Figure 2:
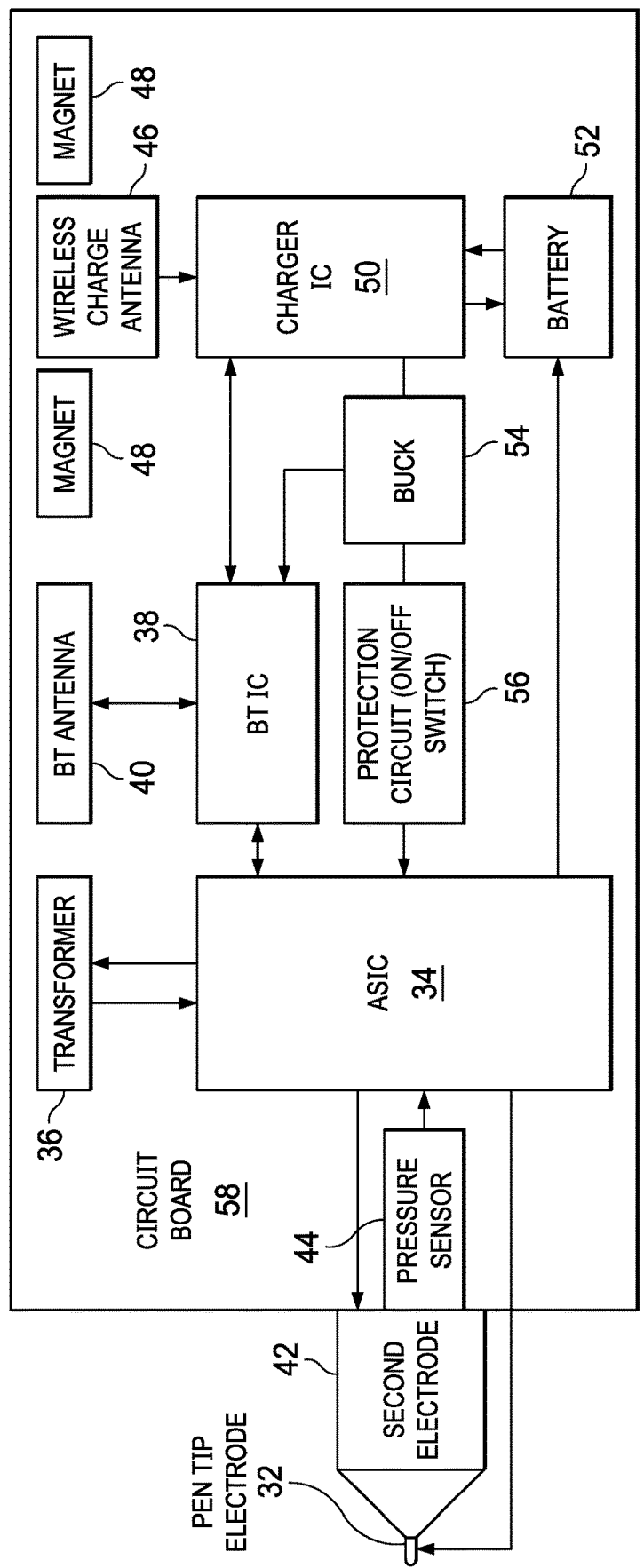
FIG. 2 depicts a circuit block diagram of components of a stylus to provide an active capacitance writing tip with automated power control.

Referring now to FIG. 2, a circuit block diagram depicts components of a stylus to provide an active capacitance writing tip with automated power control. Signals to enhance capacitive detection at writing tip 32 are managed by an ASIC 34 or other processing resource interfaced with a transformer 36 and interfaced with a Bluetooth integrated circuit 38 or other wireless communication resource that communicates with an information handling system through an antenna 40. For example, an alternative embodiment may use a system on chip architecture to control transformer 36 and communicate wireless signals. Capacitive detection signals are provided through a secondary electrode 42 based upon an indication from pressure sensor 44 of a touch of writing tip 32 to a writing surface. In the example embodiment, a wireless charge antenna 46 accepts external power when the stylus couples to a charger with magnets 48. A charger integrated circuit 50 receives external power to charge a battery 52 that powers the internal components during normal use by discharging through charger 50 to a buck circuit 54 through a protection circuit 56 and separately to Bluetooth integrated circuit 38. In an alternative embodiment, Bluetooth integrated circuit 38 may also be powered through buck circuit 54 or through protection circuit 56 to provide power management as described below.

Protection switch 56 intercedes between buck circuit 54 and ASIC 34 to disconnect and reconnect power based upon an extended or retracted position of writing tip 32. For example, as described in greater detail below, protection circuit 56 is a mechanical switch interfaced with a position of writing tip 32 that cuts off power when writing tip 32 retracts and reconnects power when writing tip 32 extends. A complete cut off of power to ASIC 34 prevents generation of capacitance enhancing signals at writing tip 32 that might cause disruption of the sensitivity of the signal and result in ink blotches at a subsequent use of the stylus at a touchscreen display. In addition, cut off of power to ASIC 34 reduces power consumption of the stylus during idle periods to prolong battery life. Battery life is prolonged both as a function of idle power dissipation and by reducing the risk that inadvertent presses at writing tip 32 may trigger a capacitive signal generation by activation of pressure sensor 44. Maintaining power at Bluetooth integrated circuit 38 allows Bluetooth functionality to continue when writing tip 32 is retracted. For instance, firmware upgrades may be supported while the stylus is inactive as may Bluetooth related location services in case the stylus is lost. In one example embodiment, Bluetooth integrated circuit 38 may confirm power cut off at ASIC 34 before performing wireless firmware updates so that end user writing with the stylus is not interrupted by the firmware upgrades.

Figure 3:
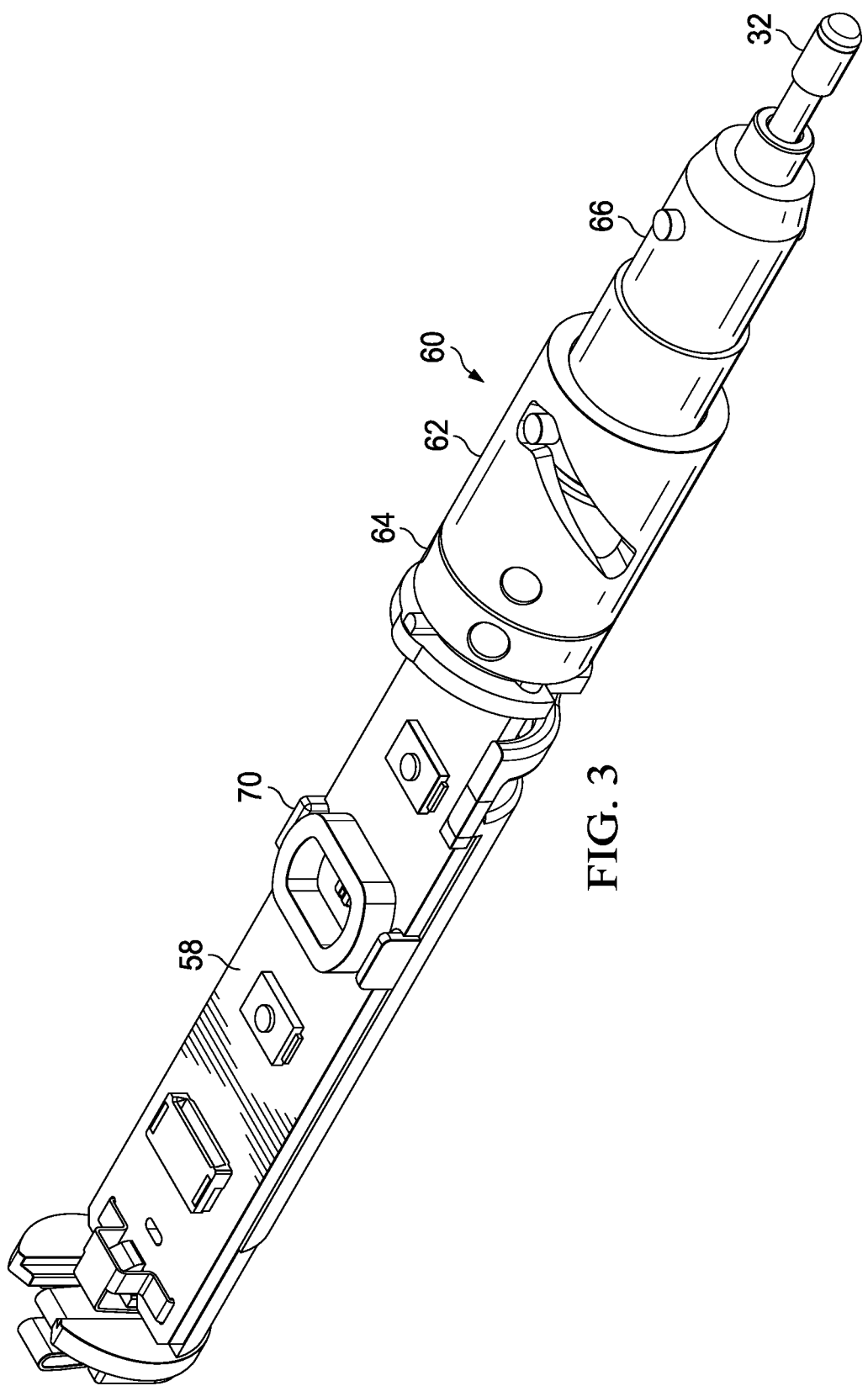
FIG. 3 depicts a side perspective view of an example embodiment of a power circuit that manages power application to a writing tip based upon an extended or retracted position of the writing tip.

Referring now to FIG. 3, a side perspective view depicts an example embodiment of a power circuit that manages power application to a writing tip 32 based upon an extended or retracted position of the writing tip 32. A circuit board 58 held in a circuit board housing 70 interfaces electronic components of the stylus to generate capacitance signals that are communicated to writing tip 32 held by a tip position controller 60. Tip position controller 60 includes a central body 66 that fixedly holds writing tip 32 and extends a pin through a cam slot formed in sleeve 62. A power control mechanism 64 integrates a leaf spring, detailed below, that rotates relative to circuit board housing 70 to connect and disconnect power based upon the relative rotational position of power control mechanism 64 and circuit board housing 70. Sleeve 62 translates rotational motion of the main stylus housing and a stylus end cap relative to an inner assembly to synchronize application of power by power control mechanism 64 with extension of writing tip 32. For example, power control mechanism 64 rotates with sleeve 62 relative to circuit board housing 70, which is fixed in position relative to an outer stylus housing and a tip cap. A stud described below extends out of the stylus outer housing to rotate the inner sleeve structure relative to the stylus outer cover, a writing tip cap and the circuit board housing 70. An end user extends and retracts writing tip 32 with rotation of the inner sleeve structure relative to the main body and tip cap, resulting in rotation of sleeve 62 and power control mechanism 64 relative to central body 66, which extends the writing tip by interaction of a pin extending from sleeve 62 into the tip end cap. The cam slot of sleeve 62 engages with the pin extending into it from central body 66 to retract and extend central body 66 in response to the relative rotation.

Figure 4:
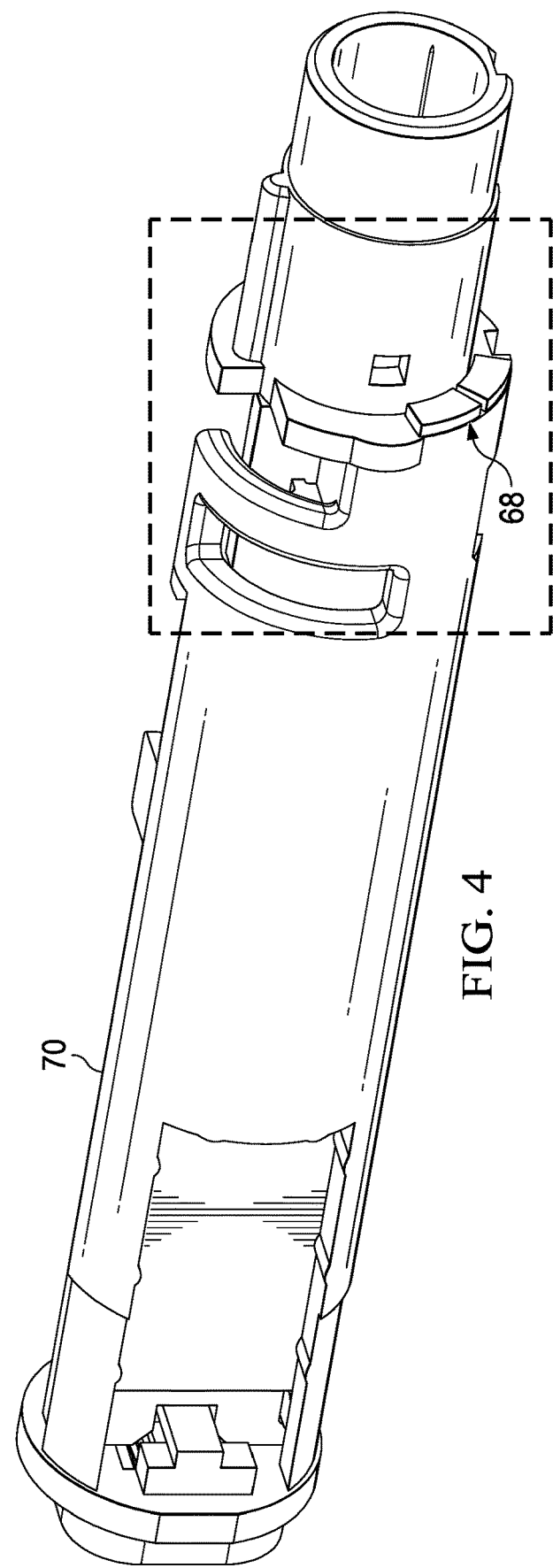
FIGS. 4 and 4A depict a side perspective view of the circuit board housing opposite the circuit board and power pads that coordinate application of power to the circuit board.
Figure 4A:
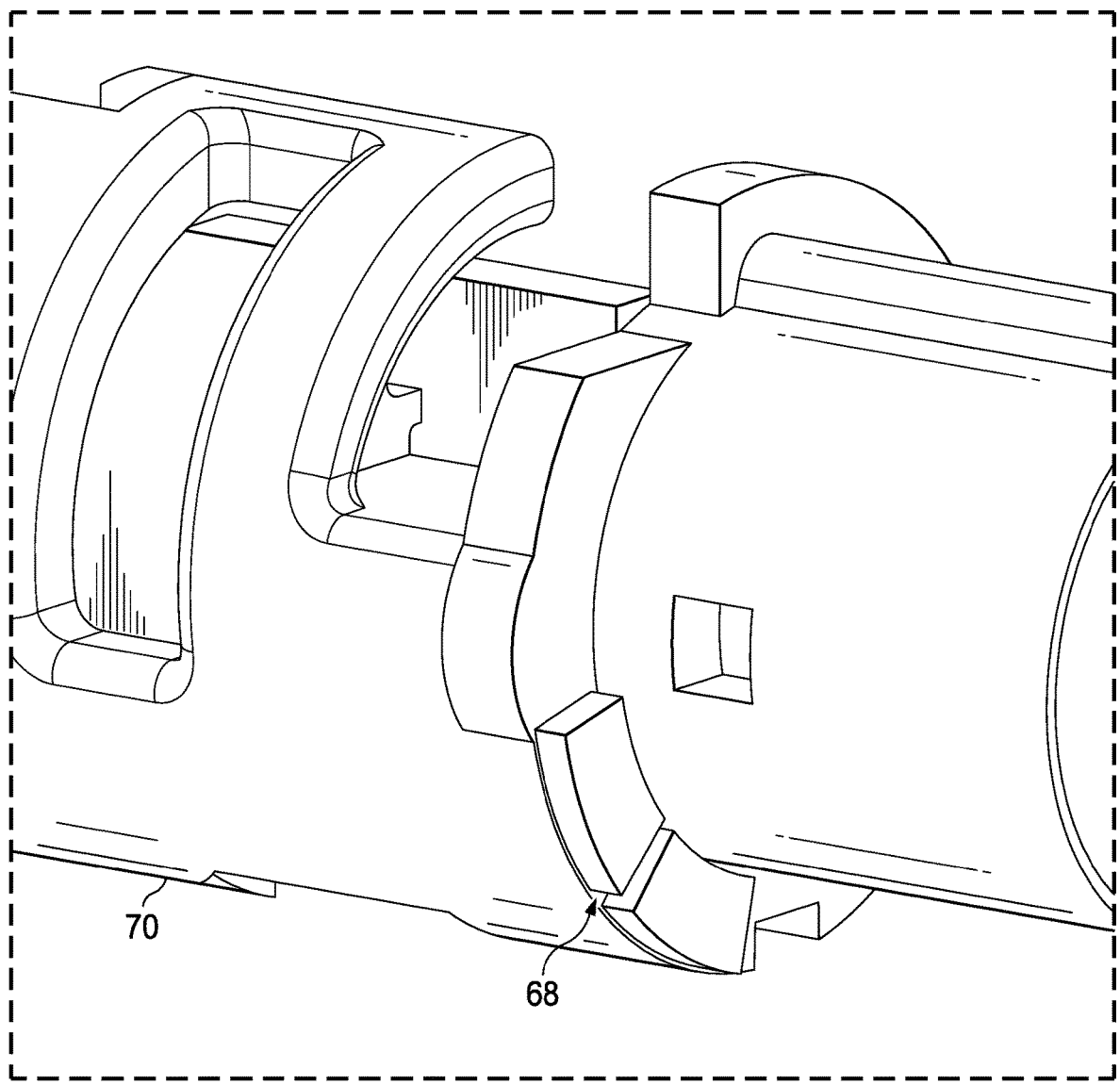

Referring now to FIGS. 4 and 4A, a side perspective view depicts the circuit board housing 70 opposite the circuit board and power pads 68 that coordinate application of power to the circuit board. FIG. 4 depicts power pads 68 disposed on a side edge formed in circuit board housing and facing towards power control mechanism 64. FIG. 4A depicts a gap formed in a center of power pads 68 that prevent flow of current across the two halves. In the example embodiment, a leaf spring disposed on an opposing surface of power control mechanism 64 overlaps the gap of power pads 68 to provide for conduction of current across the gap of power pads 68. In alternative embodiments, power pads 68 may couple to the power control mechanism 64 and the leaf spring to the circuit board holder 70. Alternatively, other types of mechanical switches may be used.

Referring now to FIG. 5, an exploded view of the stylus depicts the interaction of the mechanical components to synchronize writing tip position and power application. A stylus outer housing 72 couples to a tip end cap 76 to rotate relative to the inner sleeve structure. Power control mechanism 64 rotationally couples within stylus outer housing 72 by a pin extending into a slot formed on the inner surface of stylus outer housing 72. Power control mechanism 64 fixedly couples to sleeve 62 so that both power control mechanism 64 and sleeve 62 rotate relative to stylus outer housing 72 when tip cap 76 rotates with stylus outer housing 72. Central body 66 moves along the axis of stylus outer housing 72 in response to rotation of sleeve 62 that translates by engagement of pin extending from central body 66 into the cam slot of sleeve 62. A spring 74 disposed around writing tip 32 provides a bias of writing tip 32 to extend out an opening of tip cap 76. Tip cap 76 couples around sleeve 62 to allow rotation relative to stylus outer housing 72 and has a slot on its inner surface that defines an axis along which central body 66 slides as rotational motion is translated to linear motion by the cam slot.

Referring now to FIG. 6, a side perspective view depicts the power control mechanism 64 and leaf spring 84 that cooperate to connect and disconnect power to the stylus processing components. Power control mechanism 64 includes a feature 78 defining an opening to accept leaf spring 84. Leaf spring 84 couples in feature 78 at a fixed location 86 so that a central raised spring portion biased against the power pads when rotated in alignment with them. Power control mechanism 64 includes a stud assembly opening 80 that accepts a stud to extend into the stylus outer housing. A pin 82 extends out to engage with the sleeve for accepting rotational movement introduced by the end cap during extension of the writing tip.

Figure 7:
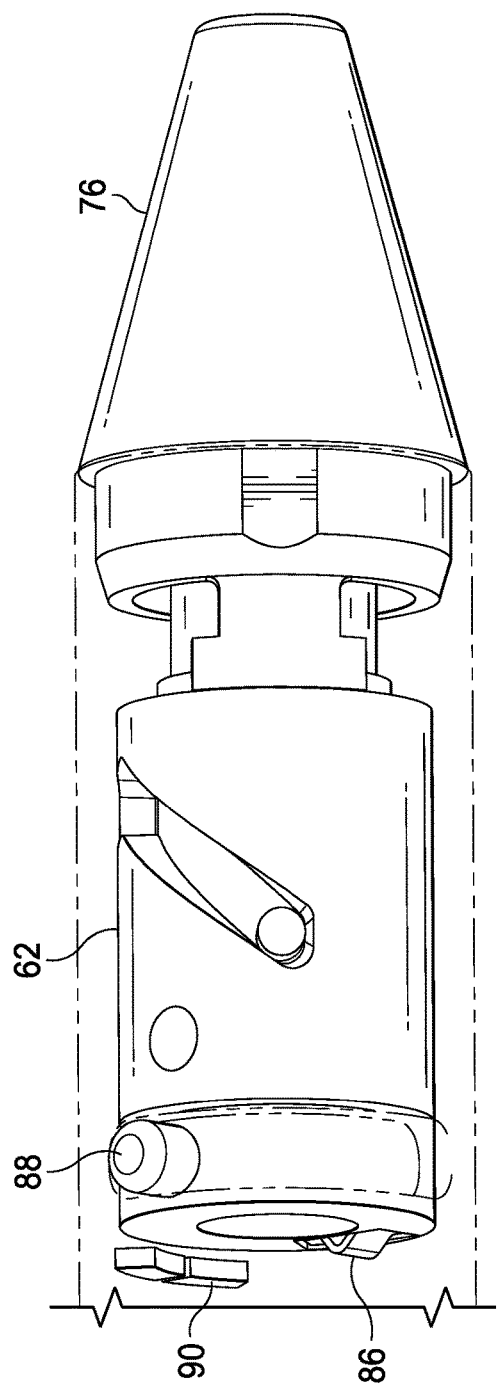
FIG. 7 depicts a side view of the stylus with the outer housing removed and having the writing tip in the retracted position.

Referring now to FIG. 7, a side view depicts the stylus with the outer housing removed and having the writing tip in the retracted position. In the example embodiment, a stud 88 couples to power control mechanism 64 and extends out of the stylus outer housing where an end user can rotate stud 88 relative to the outer housing. Rotation of stud 88 translates to sleeve 62 bringing the pin of the central body up the cam slot of sleeve 62 to retract the writing tip into tip cap 76. Rotation of power control mechanism 64 to retract the writing tip also rotates leaf spring 86 out of alignment with power pads 90 integrates in the circuit board holder 70 disposed within the stylus outer housing. By moving leaf spring 86 out of alignment with power pads 90, current flow between the separate portions of power pad 90 is cut off so that the ASIC of the stylus circuit board has power cut off.

Figure 8:
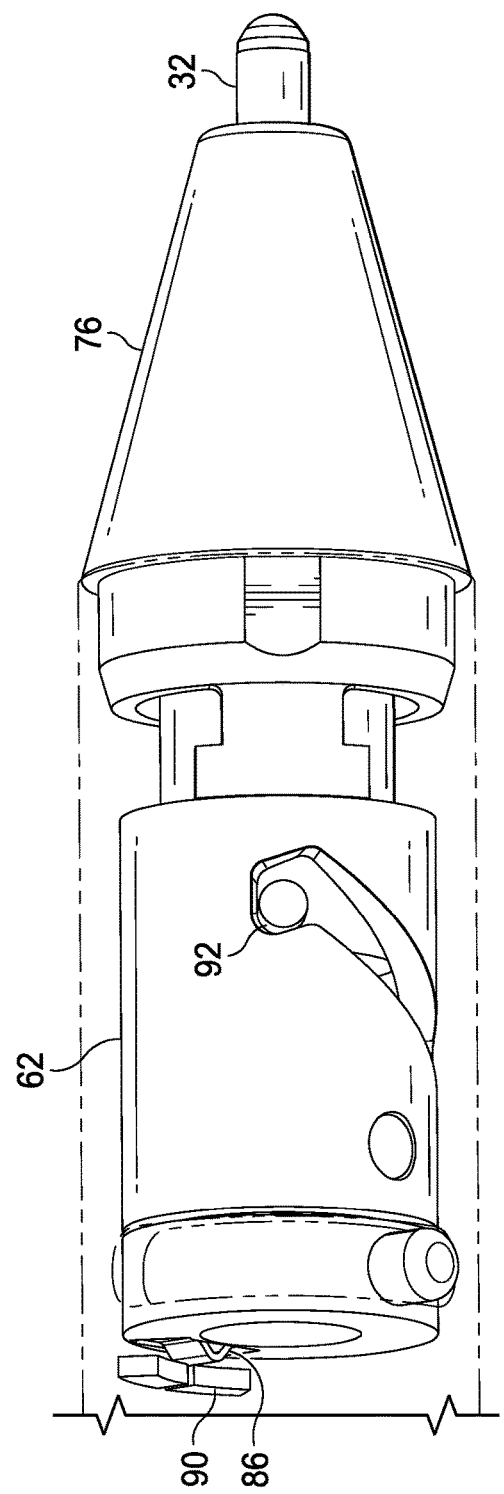
FIG. 8 depicts a side view of the stylus with the outer housing removed and having the writing tip in the extended position.

Referring now to FIG. 8, a side view depicts the stylus with the outer housing removed and having the writing tip 32 in the extended position. Stud 88 has rotated power control mechanism 64 relative to the outer stylus housing to bring leaf spring 86 in contact with power pad 90 to enable current flow to the ASIC so that writing tip 32 receives capacitive signals. Rotation of power control mechanism 64 rotates sleeve 62 to force central body 66 out by action of the cam slot of sleeve 66 on the pin extending from central body 66. A groove 92 formed at the end of the cam slot captures the pin extending from central body 66 to help maintain writing tip 32 in the extended position. In the example embodiment, stud 88 provides an end user with access to rotate power control mechanism 64. In alternative embodiments, tip cap 76 might be used as the rotation interface, such as by fixing central body 66 relative to the stylus outer housing and fixing tip cap 76 to sleeve 62, such as similar to the embodiment described below. Although the example embodiment has sleeve 62 indirectly coupled to leaf spring 84 through power control mechanism 64, in an alternative embodiment sleeve 62 and power control mechanism 64 may be built as an integrated assembly for direct coupling.

Figure 9:
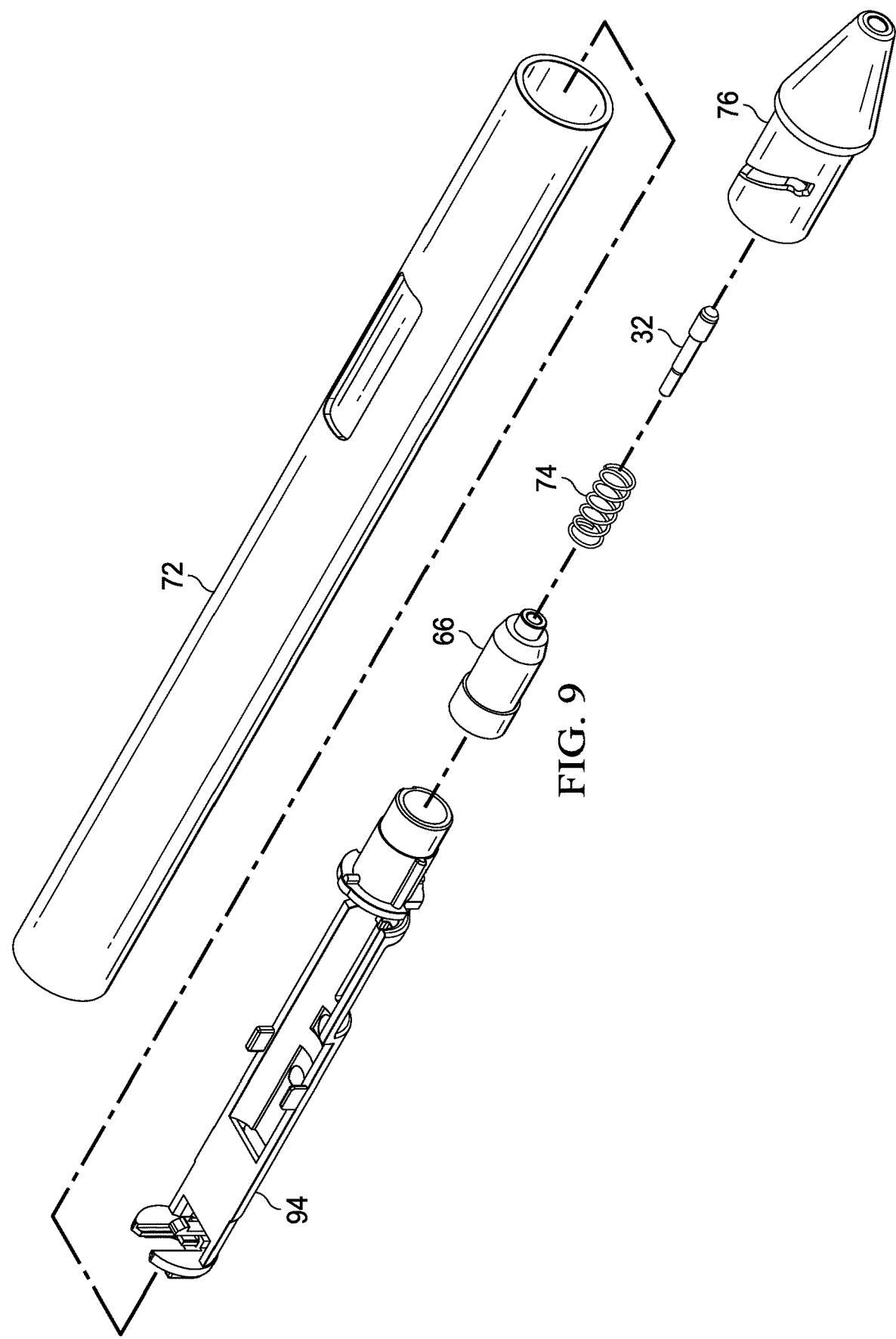
FIG. 9 depicts an exploded view of an example embodiment of a stylus that exposes and covers the writing tip with rotation of the tip cap.

Referring now to FIG. 9, an exploded view depicts an example embodiment of a stylus that exposes and covers the writing tip 32 with rotation of the tip cap 76. In the example embodiment, stylus outer housing 72 contains a circuit board holder having a cylinder member 94 extending towards writing tip 32 and inserting into tip cap 76 fits. A central body 66 fits over cylindrical member 94 and holds writing tip 32 in a fixed position relative to stylus outer cover 72. A pin extending from the end of cylinder member 94 fits into a cam slot formed in tip cover 76 to extend and retract tip cover 76 relative to stylus outer housing 72 when tip cover 76 is rotated. When tip cover 76 rotates to slide towards stylus main housing 72, writing tip 32 is exposed. When tip cover 76 rotates to slide away form stylus main housing 72, writing tip 32 is hidden. A spring 74 aids in biasing the writing tip to an extended position.

Figure 10A:
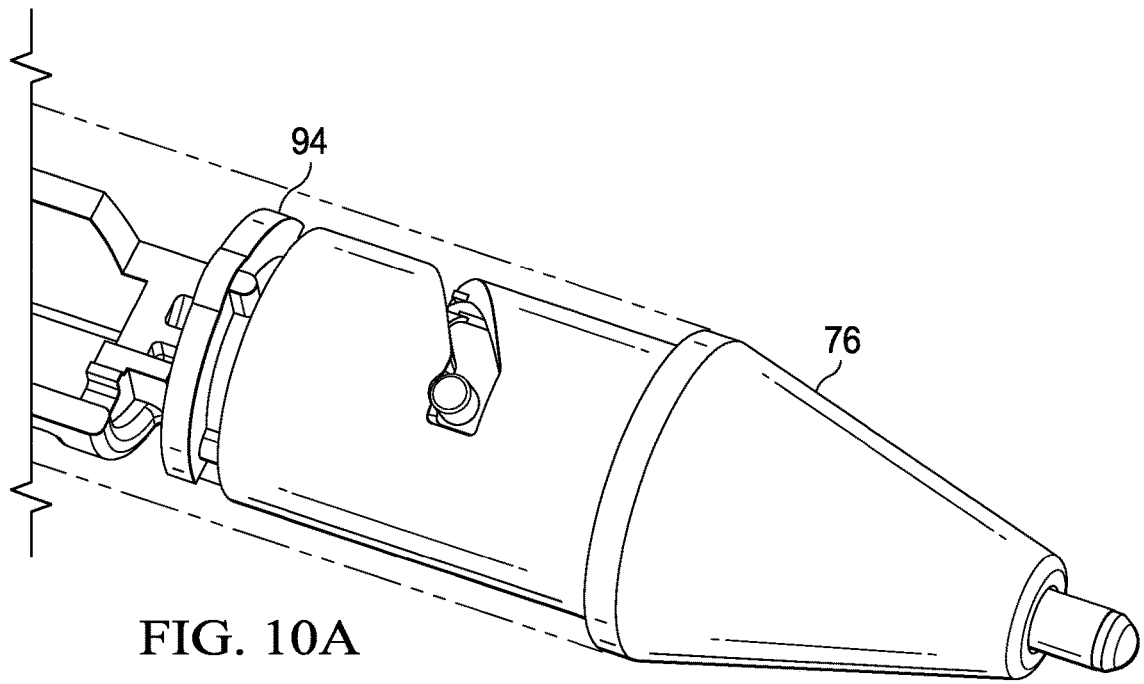
FIGS. 10A and 10B depict a side view of the stylus with the outer cover removed and having the writing tip exposed and covered.
Figure 10B:
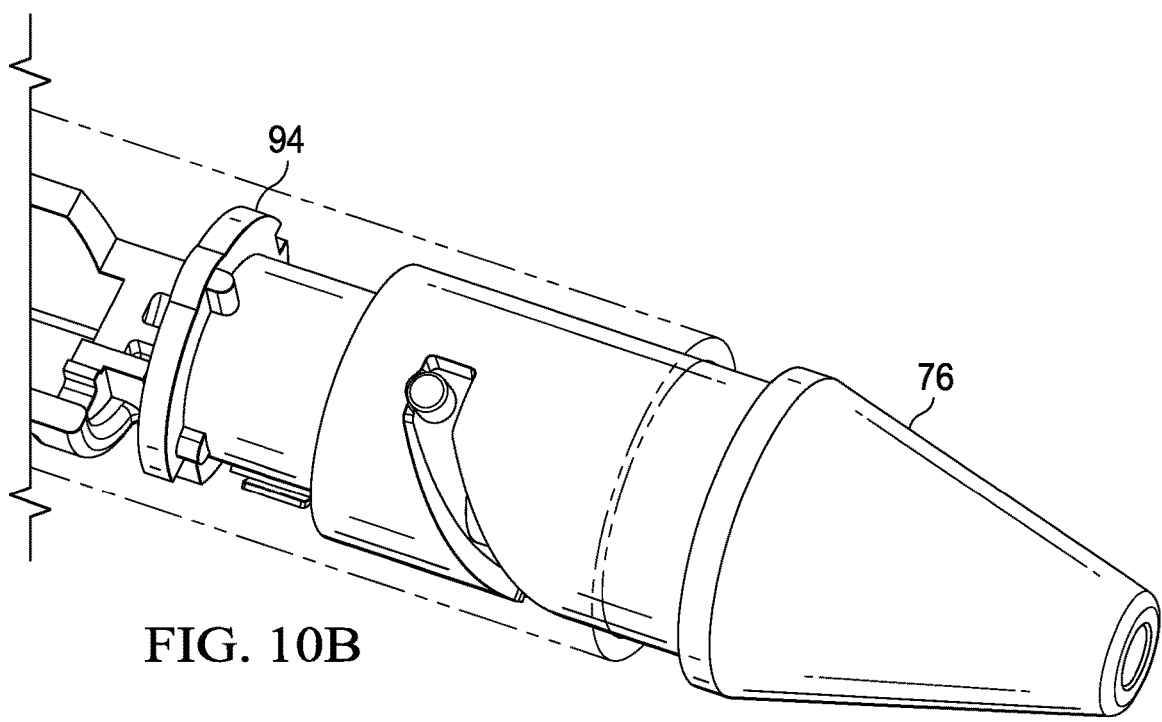

Referring now to FIGS. 10A and 10B, a side view depicts the stylus with the outer cover removed and having the writing tip exposed and covered. FIG. 10A depicts writing tip 32 in the extended position by rotation of tip cap 76 so that the pin extending from cylinder member 94 engages with the cam slot of tip cap 76 to bring tip cap 76 into the stylus outer housing. FIG. 10B depicts writing tip 32 in the retracted position by rotation of tip cap 76 so the pin extending from cylinder member 94 engages with the cam slot of tip cap 76 to extend tip cap 76 out from the stylus outer housing. Each end of the cam slot includes an indentation to help hold the rotational position selected by the end user.

Figure 11:
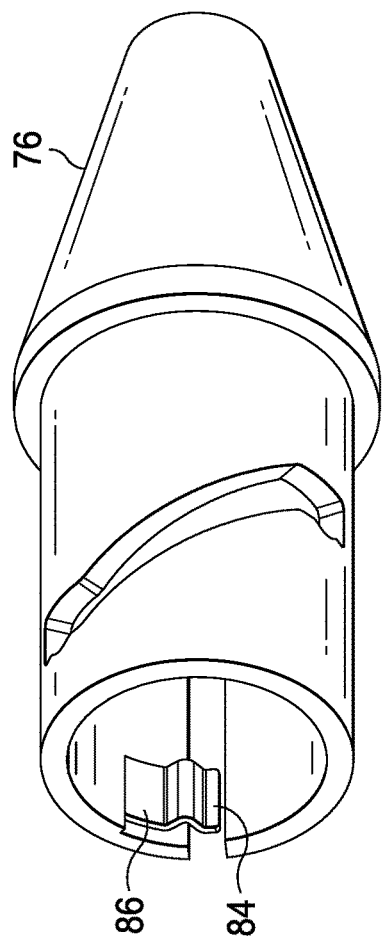
FIG. 11 depicts a rear perspective view of the tip cap having the cam slot and leaf spring.

Referring now to FIG. 11, a rear perspective view of tip cap 76 depicts placement of leaf spring 84 to bring an extension 86 into contact with power pads disposed on the cylinder member. Linear motion of tip cap 76 in response to rotation and work of the cam slot moves leaf spring 84 into and out of contact with power pads disposed on the cylinder member as illustrated below.

Figure 12:
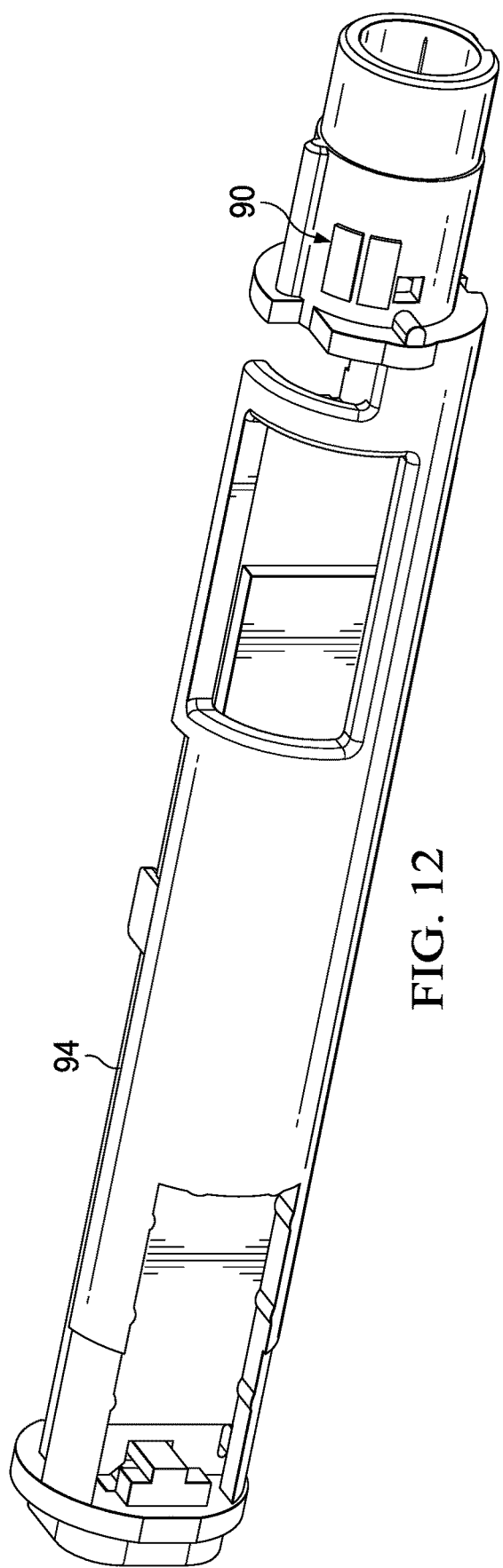
FIG. 12 depicts a side perspective view of a circuit board holder with the position of power pads to contact the leaf springs disposed within the tip cap.

Referring now to FIG. 12, a side perspective view of a circuit board holder 94 depicts the position of power pads 90 to contact the leaf springs disposed within the tip cap. In the example embodiment, cylinder member 90 extends from circuit board holder 94 and has power pads 68 coupled on an outer surface and interfaced with power of the circuit board. As the tip cap rotates to extend the writing tip, power is cut off to the ASIC by removal of the leaf spring from the power pads. When the writing tip is extended by rotation of tip cap in towards the stylus outer housing, the leaf springs contact power pads 68 to provide current flow across the separate power pad portions and to the ASIC.

Although the present invention has been described in detail, it should be understood that various changes, substitutions and alterations can be made hereto without departing from the spirit and scope of the invention as defined by the appended claims.

What is claimed is:

1. An information handling system comprising:
a housing;
a processor disposed in the housing and operable to execute instructions to process information;
a memory disposed in the housing and interfaced with the processor to store the instructions and information;
a display integrated in the housing and interfaced with the processor, the display operable to present the information as visual images, the display having a touchscreen that detects touches and reports the touches to the processor as inputs; and
a stylus separate from the housing, the stylus having an outer housing terminating at a first end with a writing tip selectively extending and retracting relative to a tip cap in response to a tip position controller, the tip position controller applying power to a processing resource disposed in the outer housing that generates active capacitance at the writing tip when the writing tip extends, the tip position controller removing power from the processing resource when the writing tip retracts, the tip position controller having a sleeve disposed in a central body, the sleeve having a cam slot, the central body coupled to the writing tip and having a pin extending into the cam slot engaged so that rotation of the sleeve extends and retracts the writing tip by interaction of the pin in the cam slot, the stylus further having a circuit board holder disposed in the outer housing proximate the sleeve supporting the processing resource and having a power interface of a power pad with first and second portions coupled to the circuit board holder and a leaf spring coupled to the sleeve and aligned to complete a power circuit across the first and second power pad portions when the tip extends and break the power circuit across the first and second portions when tip retracts.

2. The information handling system of claim 1 further comprising a stud coupled to the sleeve and extending out of the outer housing through a slot, the stud rotating the sleeve to extend and retract the writing tip.

3. An information handling system comprising:
a housing;
a processor disposed in the housing and operable to execute instructions to process information;
a memory disposed in the housing and interfaced with the processor to store the instructions and information;
a display integrated in the housing and interfaced with the processor, the display operable to present the information as visual images, the display having a touchscreen that detects touches and reports the touches to the processor as inputs; and
a stylus separate from the housing, the stylus having an outer housing terminating at a first end with a writing tip selectively extending and retracting relative to a tip cap in response to a tip position controller, the tip position controller applying power to a processing resource disposed in the outer housing that generates active capacitance at the writing tip when the writing tip extends, the tip position controller removing power from the processing resource when the writing tip retracts;

wherein the tip position controller further comprises:

a circuit board holder disposed in the outer housing and having a cylinder member extending towards the writing tip;

a central body coupled to the cylinder body and holding the writing tip in a fixed position relative to the circuit board holder; and a power interface disposed between the circuit board holder and the sleeve;

wherein the tip cap has a cam slot engaged with a pin extending from the cylinder member and rotation of the tip cap relative to the outer housing moves the tip cap towards and away from the circuit board holder to hide and expose the writing tip.

4. The information handling system of claim 3 further comprising a power interface disposed between the tip cap and cylinder member to apply and remove power at the processing resource based upon the position of the tip cap relative to the circuit board holder.

5. The information handling system of claim 4 wherein the power interface comprises:

a power pad disposed on the cylinder member and having first and second separated portions; and a leaf spring coupled to the tip cap and aligned to complete a power circuit across the first and second power pad portions when the tip is exposed from the tip cap.

6. A method for managing a stylus input device, the method comprising:

writing on a touchscreen display with a writing tip exposed at a first end of a cylinder housing;

applying a capacitive signal at the writing tip with a processing resource disposed in the stylus input device;

retracting the writing tip into the stylus input device; and in response to the retracting, removing power from the processing resource;

wherein the retracting further comprises:

rotating a sleeve disposed within the stylus input device, the sleeve having a cam slot; and translating the rotating to the writing tip with a pin coupled to a central body, the central body holding the writing tip; and wherein the removing power further comprises:

coupling a power interface to the sleeve and a circuit board housing disposed in the stylus input device; and misaligning the power interface with the rotating.

7. The method of claim 6 further comprising:

extending the writing tip out of the stylus input device; and in response to the extending, applying power to the processing resource.

8. The method of claim 7 wherein the extending further comprises:

rotating a tip cap disposed at the end of the stylus input device, the tip cap having a cam slot; and translating the rotating into axial movement of the tip relative to the writing tip with a pin coupled to a central body, the central body holding the writing tip and fixed in position.

9. The method of claim 8 wherein the applying power further comprises:

coupling a power interface to an inner surface of the tip cap and a cylinder member on which the tip cap axially slides; and aligning the power interface with axial sliding of the tip cap to expose the writing tip.

10. The method of claim 6 wherein the power interface comprises:

a power pad coupled to the circuit board housing, the power pad having first and second separate portions; and a leaf spring coupled to the sleeve, the leaf spring rotating to alignment with the power pad to complete a power circuit when the writing tip extends and rotating to misalignment with the power pad to break the power circuit when the writing tip retracts.

11. An information handling system stylus comprising:

a cylindrical housing;

a tip cap coupled at one end of the cylindrical housing;

a circuit board holder disposed in the cylindrical housing and having a processing resource operable to generate a capacitive signal at a writing tip;

a central body disposed in the cylindrical housing;

a writing tip coupled to the central body and disposed at the one end of the cylindrical housing, the writing tip operable to place an input touch at a touchscreen display with the capacitive signal; and a tip position controller interfaced with the central body to extend and retract the writing tip at an opening of the tip cap; and a power interface disposed between the circuit board holder and the tip controller to apply power to the processing resource when the writing tip extends from the tip cap and remove power from the processing resource when the writing tip retracts into the tip cap;

wherein the tip position controller comprises:

a sleeve disposed in the cylindrical housing and around the central body, the sleeve having a cam slot; and a pin extending from the central body into the cam slot, rotation of the sleeve engaging the pin in the cam slot to retract and extend the writing tip; and wherein the power interface comprises:

a power pad coupled to the circuit board holder and having first and second separated portions; and a leaf spring coupled to the sleeve and aligned to rotate to complete a circuit between the first and second separated portions when the writing tip extends and to break the circuit when the writing tip retracts.

12. The information handling system stylus of claim 11 wherein the position controller comprises a pin extending from the central body and engaged with a cam slot formed in the tip cap, rotation of the tip cap translated into axial motion of the tip cap that exposes and hides the writing tip.

* * * * *